United States Patent
Beer et al.

(10) Patent No.: US 12,498,457 B2
(45) Date of Patent: Dec. 16, 2025

(54) SYSTEM AND METHOD FOR TESTING A RADAR DEVICE

(71) Applicant: Rohde & Schwarz GmbH & Co. KG, Munich (DE)

(72) Inventors: Matthias Beer, Neubiberg (DE); Gerhard Hamberger, Griesstaett (DE); Steffen Neidhardt, Dorfen (DE); Maximilian Bogner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 356 days.

(21) Appl. No.: 18/174,352

(22) Filed: Feb. 24, 2023

(65) Prior Publication Data
US 2024/0288543 A1    Aug. 29, 2024

(51) Int. Cl.
*G01S 7/40* (2006.01)
(52) U.S. Cl.
CPC ................... *G01S 7/4082* (2021.05)
(58) Field of Classification Search
CPC ........ G01S 13/006; G01S 13/931; G01S 7/03; G01S 7/4052; G01S 7/4082; G01S 7/4095; G01S 1/00; G01S 3/00
See application file for complete search history.

(56) References Cited

U.S. PATENT DOCUMENTS

| | | | | |
|---|---|---|---|---|
| 2010/0109940 A1* | 5/2010 | Williams | ............... | G01S 7/4052 342/171 |
| 2017/0227627 A1* | 8/2017 | Chanda | ................ | G01S 7/4052 |
| 2020/0319325 A1 | 10/2020 | Kong | | |
| 2021/0356561 A1* | 11/2021 | Li | ........................ | G01S 7/4095 |
| 2022/0082700 A1 | 3/2022 | Berneck et al. | | |
| 2023/0305107 A1* | 9/2023 | Hamberger | ............... | G01S 7/40 |

FOREIGN PATENT DOCUMENTS

EP    4 080 238 A1    10/2022

OTHER PUBLICATIONS

DSPACE; "Radar Test Bench—Compact 3D"; Dec. 2021; total 2 pages; dSPACE GmbH; XP093163023; Retrieved from the Internet: URL: https://www.dspace.com/shared/data/pdf/2021/dSPACE-Radar-Testbench-Compact-3D_TwoPager_2021-12_E.pdf.
DSPACE Magazine; "Real Echoes in the Lab"; Dec. 2017; pp. 48-51; dSPACE GmbH; XP055679028; Retrieved from the Internet: URL: https://www.dspace.com/shared/data/pdf/2017/10_Real%20Echoes%20in%20the%20Lab_en.pdf.
Extended European Search Report issued in EP 24 15 0838.1-1206 by the European Patent Office on Jun. 3, 2024, which is related to U.S. Appl. No. 18/174,352.

* cited by examiner

*Primary Examiner* — Timothy X Pham
(74) *Attorney, Agent, or Firm* — Studebaker Brackett PLLC

(57) ABSTRACT

The present disclosure relates to a system for testing a radar device. The system comprises: a plurality of EM frontends which are arranged in a field of view of the radar device and which are configured to emit electromagnetic, EM, radiation towards the radar device; and a computing device which is configured to control an EM emission behavior of the EM frontends. The computing device comprises: a first interface configured to receive information on the spatial arrangement of the plurality of EM frontends; and a second interface configured to receive information on a scene to be simulated; wherein the computing device is further configured to individually control the EM frontends based on their respective location such that the plurality of EM frontends emit the EM radiation in an emission pattern that corresponds to the scene to be simulated.

18 Claims, 5 Drawing Sheets

SYSTEM AND METHOD FOR TESTING A RADAR DEVICE

TECHNICAL FIELD

In general, the disclosure relates to over-the-air (OTA) radar testing. More particular, the disclosure relates to a system and a method for testing a radar device, such as a radar sensor.

BACKGROUND ART

Radar sensors can detect the distance and the speed of objects in an environment by emitting radar signals into the environment and capturing reflections of the signals. For example, such radar sensors are an essential technology for advanced driver assistance systems.

Testing of radar sensors is important to understand the behavior of the radar sensors under varying conditions and to make sure that the sensors work properly. Radar tests are often performed purely via software. However, it is also known to perform over-the-air (OTA) testing, where the radar sensors are stimulated by radar signals under realistic conditions.

However, most OTA testing solutions are inflexible, e.g., regarding the complexity of the environment that can be simulated and require upfront knowledge about the modulation of the radar sensor.

SUMMARY

Thus, there is a need to provide an improved system and an improved method for testing a radar device-under-test, which avoids the above-mentioned disadvantages.

This is achieved by the embodiments provided in the enclosed independent claims. Advantageous implementations of the present disclosure are further defined in the dependent claims.

According to a first aspect, the present disclosure relates to a system for testing a radar device. The system comprises: a plurality of EM frontends which are arranged in a field of view of the radar device and which are configured to emit electromagnetic, EM, radiation towards the radar device; and a computing device which is configured to control an EM emission behavior of the EM frontends. The computing device comprises: a first interface configured to receive information on the spatial arrangement of the plurality of EM frontends; and a second interface configured to receive information on a scene to be simulated; wherein the computing device is configured to individually control the EM frontends based on their respective location such that the plurality of EM frontends emit the EM radiation in an emission pattern that corresponds to the scene to be simulated.

This achieves the advantage that a highly flexible system for over-the-air (OTA) testing of radar devices can be provided. For example, by varying the number of individual EM frontends, scenes of varying complexities can be simulated.

The radar device can be a device under test (DUT) or, more particular, a radar under test (RUT). For example, the radar device can be a radar sensor, for example, an automotive radar sensor. Preferably, no information on the sensor modulation is required for testing the radar device with the system.

The scene can be a static scene or a dynamic scene, i.e., a scene that changes over time. The scene can comprise an environment to be simulated. The environment can comprise a terrain and/or one or more buildings.

The EM radiation can be radar radiation, e.g., mm wave radiation (i.e., radiation in the microwave range). For example, the EM radiation can mimic or corresponds to a radar echo of a radar signal, for instance of a radar signal which was emitted by the radar device.

The EM frontends can be EM frontend devices configured to emit the EM radiation. The EM radiation can be RF radiation. In particular, the EM frontends can be configured to emit the EM radiation in the form of RF signals, e.g., radar signals.

For example, the EM frontends can be arranged in various different spatial arrangements. Also, the total number of the EM frontends can be varied, e.g., depending on the complexity of the simulation.

The computing device can form a scene configuration unit. The computing device can execute a configuration and/or control software for controlling the EM frontends.

Besides the plurality of EM frontends in the field of view of the radar device, the system could comprise further EM frontends, e.g., frontends which are currently not used or not needed for scene simulation.

In an embodiment, the first interface is further configured to receive information on a type of each of the EM frontends; wherein the computing device is configured to individually control the EM frontends based on their respective location and their type.

In an embodiment, the plurality of EM frontends comprises at least two frontends of a different type. This achieves the advantage that various different EM frontends can be combined to simulate the scene.

For example, if a scene with high complexity, e.g., with many moving targets or covering a large portion of the field of view of the radar device, should be simulated, additional EM frontends can be added to the system. These additional frontends do not have to be of the same type. A user can, for instance, use various EM frontends which he already has and does not have to purchase specific frontends of a specific type.

In an embodiment, at least one EM frontend of the plurality of EM frontends comprises an antenna array.

Furthermore, at least one EM frontend can comprise a single antenna.

In an embodiment, each EM frontend of the plurality of EM frontends occupies a portion of the field of view of the radar device.

For example, the EM frontends form radar pixels for emitting a radar image which corresponds to the emission pattern. Thereby, each EM frontend can form one or several radar pixels, e.g., depending on the size and/or the number of antennas of the frontend.

In an embodiment, at least one of the plurality of EM frontends comprises a mixer; wherein the mixer is configured to convert an EM signal generated by the EM frontend to a different frequency and/or to add a Doppler shift to an EM signal generated by the EM frontend. For instance, the mixer can be used to downconvert an RF signal generated by the frontend to an IF signal, or to upconvert an IF signal to an RF signal. This achieves the advantage that the EM signals can be generated at different frequencies, e.g. to simulate moving objects. At least one of the EM frontends can further comprise a delay-line, e.g., an analog stepped delay line (ASDL).

In an embodiment, the computing device is configured to output information on an optimized spatial arrangement and/or a minimal number N of the EM frontends to simulate the scene.

For example, the computing device can output the information on the optimized spatial arrangement and/or the minimal number N of the EM frontends in response to receiving the information(s) on the scene to be simulated and/or on the type of each EM frontend.

In an embodiment, the computing device is configured to issue a warning if the scene or a portion of the scene cannot be simulated with a current arrangement of the EM frontends and/or with a current number N of the EM frontends.

For example, the computing device can issue the warning in response to receiving the information on the scene to be simulated.

The portion of the scene might refer to a spatial portion or a temporal portion (in case the scene is a dynamic) of the scene.

In an embodiment, the first interface comprises a user interface which is configured to receive the information on the spatial arrangement of the plurality of EM frontends from a user.

In an embodiment, the user interface is a graphical user interface which is configured to display graphical representations of the EM frontends and their spatial arrangement.

For example, the user can manipulate the displayed representation via a drag and drop gesture, e.g., dragging an EM frontend from ta first to a second location in the graphical user interface (GUI).

In an embodiment, the computing device comprises a further graphical user interface which is configured to receive a user input to manipulate the scene.

The user input on the further graphical user interface can be a drag and drop gesture. Via this user input, objects can be added to the scene or the location of objects in the scene can be changed.

In an embodiment, the further graphical user interface is configured to display a three-dimensional representation of the scene; wherein the further graphical user interface is configured to receive the user input on the displayed three-dimensional representation of the scene, for example in the form of a drag and drop gesture.

In an embodiment, in response to the user input, the computing device is configured to output information on an optimized spatial arrangement of the EM frontends to simulate the manipulated scene.

In an embodiment, the computing device is configured to control the EM frontends to simulate the EM behavior of complex objects, for example scattering centers, by coordinating the EM emission behavior of multiple EM frontends.

In an embodiment, the computing device is configured to control the EM frontends to simulate random or quasi-random target behavior, for example EM noise or false targets.

In an embodiment, the computing device is connected to the individual EM frontends via a communication network.

According to a second aspect, the present disclosure relates to a method of testing a radar device, the method comprising the steps of: arranging a plurality of EM frontends in a field of view of the radar device, wherein the EM frontends are configured to emit electromagnetic (EM) radiation towards the radar device; receiving information on the spatial arrangement of the plurality of EM frontends; receiving information on a scene to be simulated; and individually controlling the EM frontends based on their respective location such that the plurality of EM frontends emit the EM radiation in an emission pattern that corresponds to the scene to be simulated.

The above description with regard to the system according to the first aspects of the disclosure is correspondingly valid for the method according to the second aspect of the disclosure.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
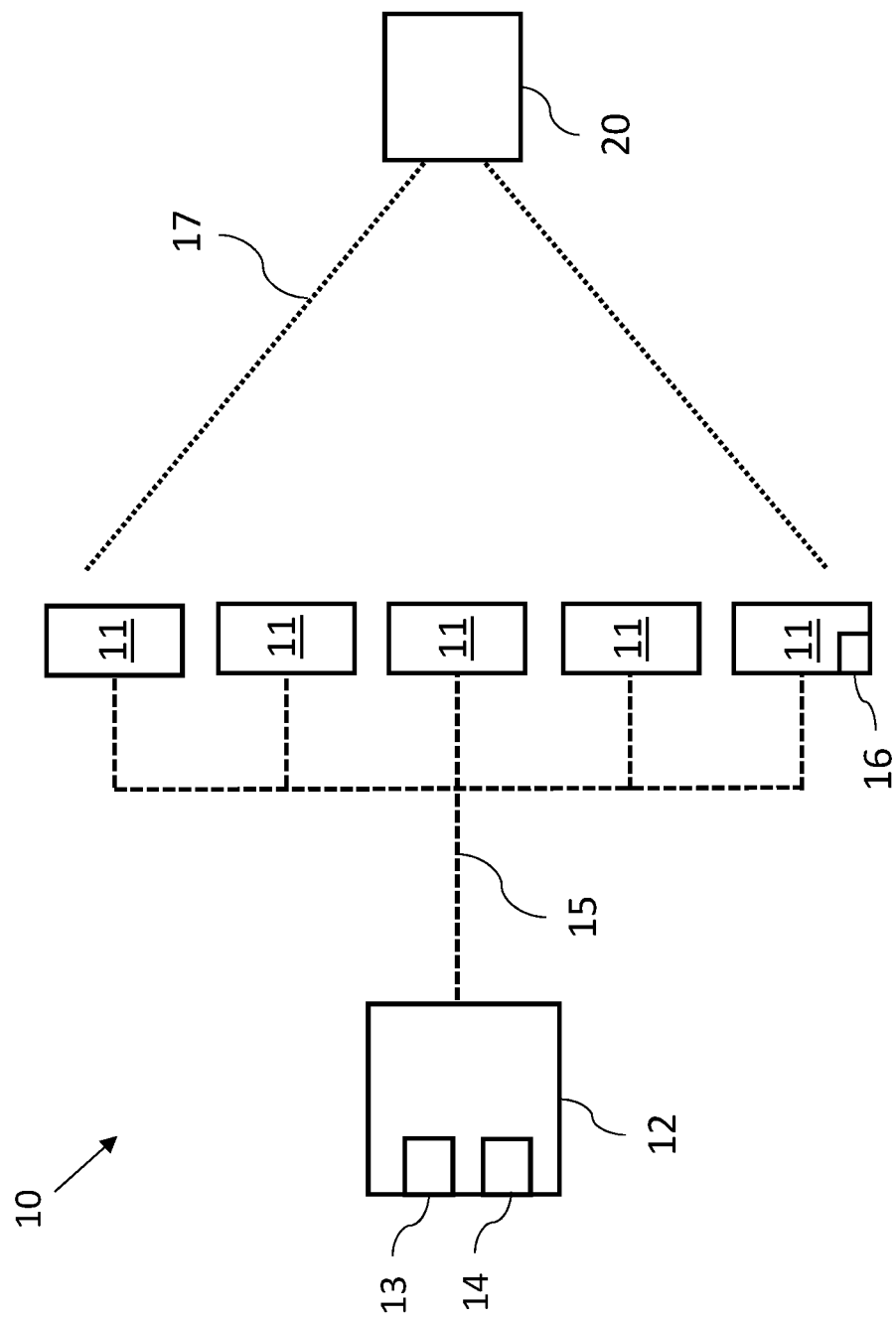
FIG. 1 shows a schematic diagram of a system for testing a radar device according to an embodiment.

FIG. 1 shows a schematic diagram of a system 10 for testing a radar device 20 according to an embodiment.

The system 10 comprises a plurality of EM frontends 11 which are arranged in a field of view 17 of the radar device 20 and which are configured to emit electromagnetic (EM) radiation towards the radar device 20, and a computing device 12 which is configured to control an EM emission behavior of the EM frontends 11. Thereby, the computing device 12 comprises a first interface 13 configured to receive information on the spatial arrangement of the plurality of EM frontends 11, and a second interface 14 configured to receive information on a scene to be simulated. The computing device 12 is further configured to individually control the EM frontends 11 based on their respective location such that the plurality of EM frontends 11 emit the EM radiation in an emission pattern that corresponds to the scene to be simulated.

The radar device 20 can be a radar under test (RUT). The radar device 20 can be or can comprise a radar sensor, for example, an automotive radar sensor. In particular, the radar device 20 can be an imaging or distributed radar sensor or can comprise such a sensor. Preferably, no information on the sensor modulation is required for testing the radar device 20 with the system 10.

The EM radiation can be RF radiation, in particular radar radiation, i.e., mm wave radiation. The EM frontends can emit the EM radiation in the form of RF signals. The EM radiation can mimic a radar echo of a radar signal, for instance of a radar signal which was emitted by the radar device 20.

Alternatively, the EM radiation could also be radiation in a wavelength range used for lidar applications, e.g., a visible wavelength range. For instance, the radar device could be a lidar device and the system 10 a lidar simulation system. In yet another alternative, the radar device 20 could be a sonic sensor, e.g. a sonic camera, and a radiation emitted by the frontends could comprise sonic radiation.

The scene to be simulated can be a static scene or a dynamic scene, i.e., a scene that changes over time. The scene can comprise an environment to be simulated and/or targets to be simulated. The environment can comprise a terrain and/or one or more buildings.

Each EM frontend 11 can comprise at least one antenna or other means for emitting the EM radiation. In addition, each EM frontend 11 can comprise a signal source for generating an EM signal which is emitted by the frontend in the form of the EM radiation.

Each EM frontend 11 can further comprise a receiving unit configure to receive a radar signal from the radar device 20. The signal source can be configured to generate the EM signal at least partially based on the received radar signal. For instance, the EM signal can be generated as a radar echo to the radar signal from the radar device 20.

The system 10 can be completely modular with regards to the total number of EM frontends 11 used and their spatial arrangement. For example, the EM frontends 10 can be arranged in various different spatial arrangements. Also, the total number of the EM frontends 11 can be varied, e.g., depending on the complexity of the simulation.

The EM frontends 11 and/or the radar device 20 can be arranged in a fixed manner, i.e., not movable during a test of the radar device 20. Alternatively, the system 10 can comprise means for moving the EM frontends 11 and/or the radar device 20, such as linear axes and/or spherical positioners. For example, the radar device 20, the scene (e.g., individual frontends), or both could be moved during a test of the radar device 20.

The computing device 12 can form or comprise a scene configuration unit. The computing device 12 can execute a configuration and/or control software for controlling the EM frontends 11. For example, the computing device 12 comprises a processor.

The first interface 13 can further be configured to receive information on a type of each of the EM frontends 11 (e.g., single antenna frontend, or antenna array frontend). The computing device 12 can be configured to consider the type of each frontend 11 in conjunction with the respective location of the frontend 11 to individually control the frontends 11 to emit the EM radiation in the emission pattern corresponding to the scene.

In particular, the emission pattern corresponds to a radar image which represents the scene. The emission pattern can be dynamic, i.e., change over time.

In particular, the computing device 12 can receive the information on the scene, e.g. an environment simulation, and map said information to the geometry of the frontends 11. The frontends 11 can then simulate the environment and/or a response of objects in the scene.

The first interface 13 can comprise or form a user interface which is configured to receive the information on the spatial arrangement of the plurality of EM frontends 11 from a user.

For instance, the user interface of the first interface 13 is a graphical user interface GUI which is configured to display graphical representations of the EM frontends 11 and their spatial arrangement in the field of view of the radar device 20. In an example, a user can manipulate the displayed representation via a drag and drop gesture, e.g., dragging an EM frontend from ta first to a second location in the GUI.

Alternatively or additionally, the first interface 13 comprises a hardware or software interface, e.g. for receiving the information on the spatial arrangement in digital form. A physical setup of the frontends 11 could be provided as data to the system 10 via the first interface 13. For example, the EM frontends 11 can be configured to geolocate themselves and/or to send out location signals which can be received by the computing device 12 via the first interface 13.

The second interface 14 may comprise a further hardware or software interface, e.g. for receiving the information on the scene in digital form.

For example, one, more or all of the EM frontends 11 may comprise a mixer 16. The mixer 16 can be configured to convert an EM signal generated by the EM frontend to a different frequency, e.g. downconvert to IF or upconvert to RF, and/or to add a Doppler shift to the signal.

At least one of the EM frontends 11 can further comprise a delay-line, e.g., an analog stepped delay line (ASDL).

Furthermore, at least one of the EM frontends 11 can be configured to modulate its EM emission to generate a delay, e.g., to simulate a distance and/or velocity of an object to the radar device 20 (e.g. a frequency ramping modulation which emulates a distance). For example, at least one EM frontend 11 can comprise a radar target simulator without a lower target distance limitation capable of continuous distance emulation. This EM frontend 11 could comprise a receiving unit configure to receive a radar signal from the radar device 20 and to provide a corresponding receiving signal, a ramp slope estimation unit configured to track a ramp slope of the radar device on the basis of the receive signal. The EM frontend 11 could further comprise a signal generator unit configured to generate an EM signal thereby setting a modulation frequency of the EM signal on the basis of the tracking information and a signal direction and a radar distance. Alternatively, it is also possible that the system 10 already knows the ramp slope and/or the modulation of the waveform.

Alternatively or additionally, an interference signal can be provided to one or more of the EM frontends 11 and the effects on the radar detection can be evaluated. The interferer (e.g., the EM frontend(s) 11 which receive(s) the interference signal) could also be moved in angle and distance; e.g., by feeding the signal to the EM frontend 11 and varying an active Tx antenna of the frontend 11 (e.g., a R&S®QAT100).

The plurality of EM frontends 11 of the system 10 can comprise multiple dissimilar frontends 11, i.e., multiple frontends of a different type. The computing device can be configured to coordinate the dissimilar frontend to radiate the EM radiation in the emission pattern. Thereby, the computing device can take the different radiation behaviors, sizes and locations of the dissimilar frontends 11 into account.

For example, at least one of the EM frontends 11 can comprise an antenna array, e.g., a frontend 11 with a plurality of azimuth antennas to allow a simulation of movement. Furthermore, at least one other EM frontend 11 may comprise multiple antennas, e.g. 3 TX and 3 RX antennas, 12 TX and 12 RX antennas or 96 Tx and 96 Rx antennas, but can only activate one antenna at a time. Yet another EM frontend 11 could comprise only one antenna.

In particular, the plurality of EM frontends 11 may comprise at least one of: a R&S®QAT100 frontend, a R&S®AREG100A frontend, a R&S®AREG800A frontend, an antenna array tile, a horn antenna or any other RX/TX combination, and also any combination of various frontends 11. For example, at least one of the frontends 11 comprises a complete radar target simulator with, e.g., 5 GHz bandwidth ranging from 76 to 81 GHz and an antenna array based on 12 RX and 12 TX antennas grouped in three segments for additional angle simulation. This frontend 11 can be capable of working independently and self-sufficiently Each of the plurality of EM frontends 11 of the system 10 can be arranged to occupy a portion of the field of view 17 of the radar device 20. However, the system 10 could comprise further EM frontends 11 outside of the field of view 17 of the radar device 20, e.g., frontends which are not used for a current simulation.

For example, the EM frontends 11 form radar pixels for emitting a radar image which corresponds to the emission pattern. Thereby, an EM-frontend can form one or several radar pixels, e.g., depending on its size and/or the number of antennas of the frontend 11. The plurality of EM frontends 11 can thereby form a radar screen in the field of view 17 of the radar device 20.

The computing device 12 can be configured to output information on an optimized spatial arrangement and/or a minimal number N of the EM frontends to simulate the scene. For instance, the computing device 12 suggests a configuration with N frontends based on the scene to be simulated.

The computing device 12 can inform the user of portions (temporal or spatial) of a scene that cannot be simulated with a current geometry of the N frontends 11. For instance, the computing 12 device can display a warning message in this case.

The computing device 12 can comprise or be connected to a display configured to show the information on the optimized spatial arrangement, minimal number N of frontends 11, and/or the warning message. The display could also form a part of the user interface to input information on the spatial arrangement of the EM frontends 11 and/or of a further graphical user interface to receive user input to manipulate the scene (see below).

The computing device 12 can further be configured to control the EM frontends 11 to simulate the EM behavior of complex objects or targets, for example scattering centers, by coordinating the EM emission behavior of multiple EM frontends. For example, multiple frontends can be utilized, e.g., to simulate a large target.

Furthermore, the computing device 12 can be configured to control the EM frontends 11 to simulate random or quasi-random target behavior. In this way, for example, the system 10 can simulate noise, disturbances of the system or false targets.

The computing device 12 can be connected to the individual EM frontends 11 via a communication network 15. In particular, the computing device 12 can control the EM frontends 11 via said network 15, e.g. synchronized (e.g., via Standard Commands for Programmable Instruments, SCIP) and controlled to add delays and/or Doppler shifts to their EM emissions. Preferably, the entire scene is directly sent to the frontends 11 (e.g., a dynamic scene which runs for a certain time) and the frontends 11 are thereby synchronized. Alternatively, the frontends 11 are updated for each cycle of emission, e.g., for each frame of the scene (real-time).

The frontends 11 can be connected to a respective backend. However, not every frontend 11 must be equipped with a backend. For example, it is also possible to directly loop-back a radar signal.

Figure 2:
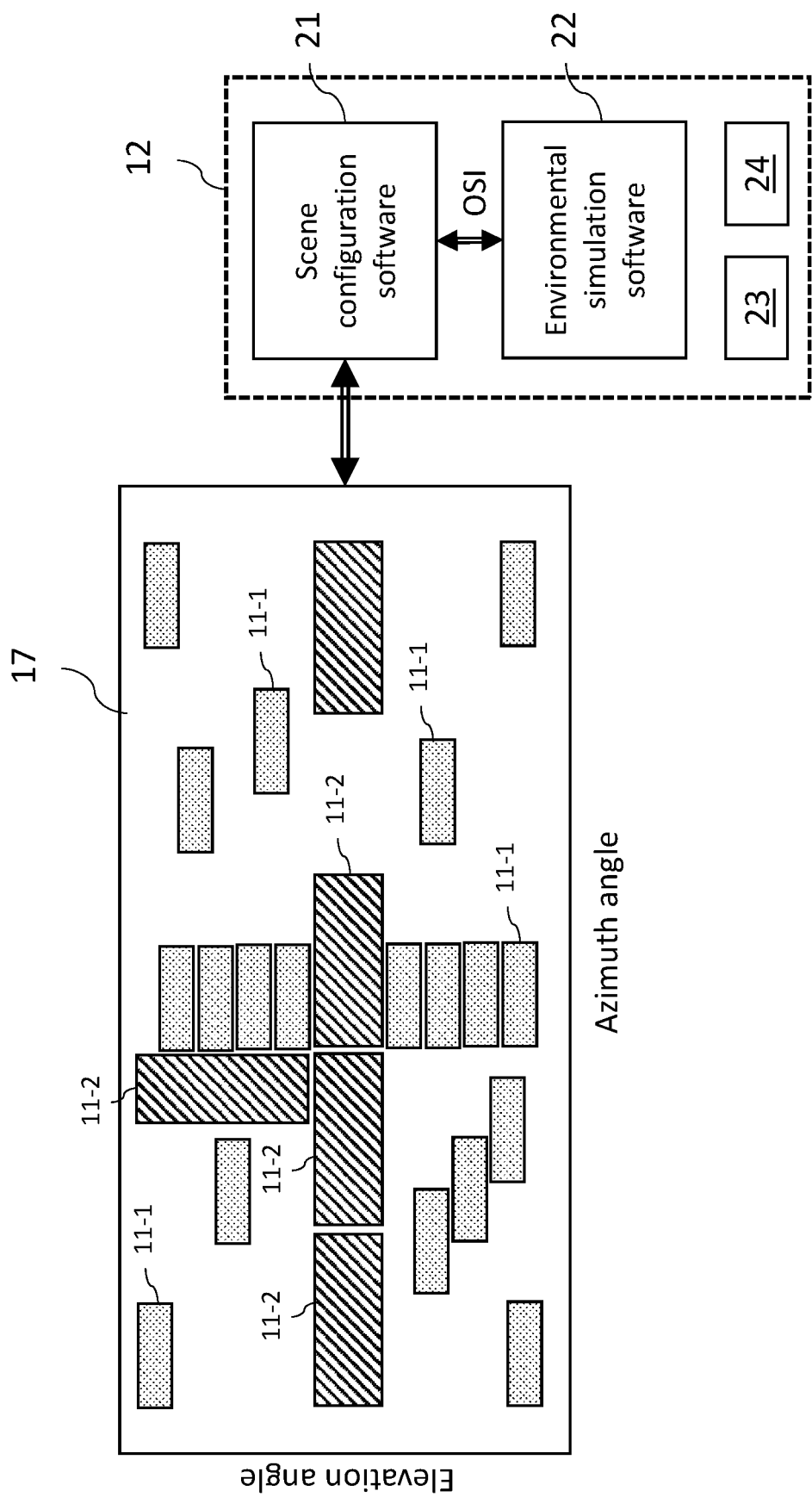
FIG. 2 shows a schematic diagram of a system for testing a radar device according to an embodiment.
Figure 3:
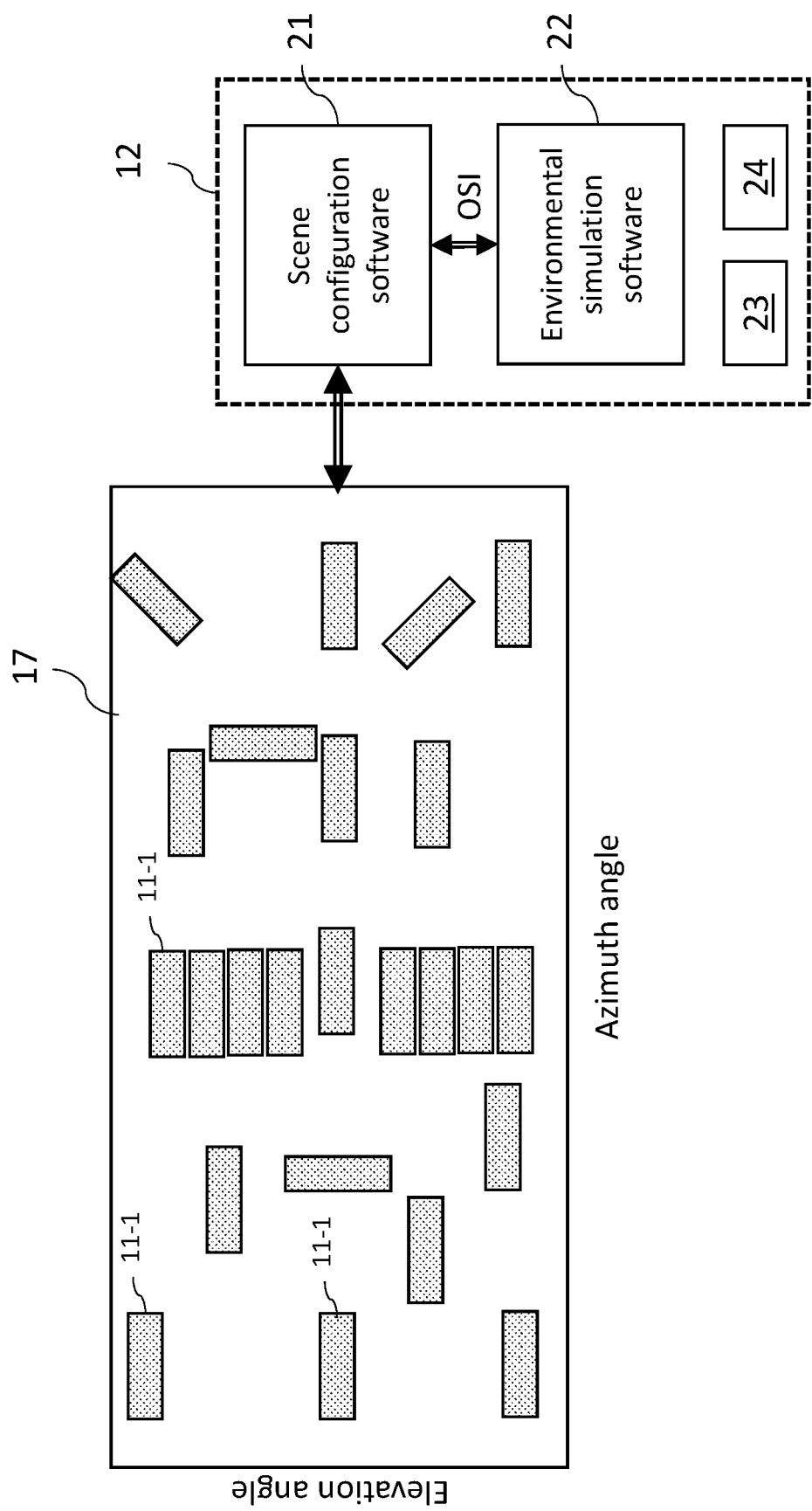
FIG. 3 shows a schematic diagram of a system for testing a radar device according to an embodiment.

FIGS. 2 and 3 show schematic diagrams of the system 10 for testing the radar device 20 according to an embodiment.

In the example, shown in FIG. 2 the system 10 comprises two different types of frontends 11-1, 11-2. For example, a first type of frontends 11-1 can comprise multiple antennas (e.g., 12 TX and 12 RX antennas) from which only one is activated, while a second type of EM frontends 12-2 can comprise an antenna array (e.g., an electronically steerable antenna array comprising a plurality of azimuth antennas).

For example, the EM frontend 12-2 could also be a R&S®AREG800A frontend with a monostatic RTx antenna.

In the example, shown in FIG. 3 the system 10 only comprises multiple frontends 11 of the same type which are distributed over the field of view 17 of the radar device 20 and which can be individually controllable.

The frontends 11-1, 11-2 can be are arranged in the field of view 17 of the radar device 20 which can be defined by an azimuth angle and an elevation angle. The radar device 20 can be located at a distance d from the frontends 11-1, 11-2.

The computing device 12 may comprise two graphical user interfaces (GUI) 23, 24. For instance, the GUI 23 can be configured to receive the information on the spatial arrangement of the plurality of EM frontends (see above). While a 2D GUI is shown, in an embodiment the GUI 23 could also show a three dimensional representation, for instance, using polar coordinates.

The further GUI 24 can be configured to receive a user input to manipulate the scene. For example, the user can manipulate the scene by, e.g., dragging and dropping objects into the scene via the GUI 24. The computing device 12 can then map the manipulated scene to the frontends 11-1, 11-2. In this way, the user can map objects or change the location of objects in the scene.

For instance, the further GUI 24 is configured to display a three-dimensional representation of the scene; and to receive the user input on the displayed three-dimensional representation. For instance, the further GUI 24 can display the drag and drop locations.

In response to this user input on GUI 24, the computing device 12 can be configured to output information on an optimized spatial arrangement of the EM frontends for simulation the manipulated scene.

The further GUI 24 could be comprised by the second interface 14 of the computing device 12.

The GUIs 23, 24 can be displayed on a common display or on separate displays of the system 10. Any of these displays can also be used to output the information on the optimized spatial arrangement of the scene or the manipulated scene and/or the warning if the scene cannot be simulated.

For example, the system 10 could also comprise a single GUI which can have the function of both GUIs 23, 24. The scene could be added and/or manipulated by adding and manipulating targets in the single GUI. If the scene is well described (e.g. even over time), the system 10 can suggest were to locate the frontends 11 (e.g., position and/or type). These information can be provided in the same (single) GUI. For instance, the GUI could show the individual target's scattering centers with a partially transparent color map. The GUI can fit the frontends 11 to a background with solid colors and, thus, one can directly see a coverage of the scene by the frontends 11.

For example, the computing device 12 can comprise software modules 21, 22 for controlling the EM frontends 11-1, 11-2. The software modules 21, 22 can comprise a scene configuration software module 21 and an environmental simulation software module 22. The modules can be connected via an open simulation interface (OSI).

For example, the scene configuration software module 21 allows to define an area as field of view (FOV) 17 in terms of azimuth and elevation in which the radar OTA simulation takes place. The user can thereby define an air gap, i.e., the distance between radar device 20 and the simulation area. Within this area, one or more EM frontends 11, 11-1, 11-2 can be positioned either graphically (via drag and drop) or geometrically.

The computing device 12 can be connected to each frontend 11, 11-1, 11-2 via the network 15, e.g., via TCP/IP.

The scene configuration software 21 can be adapted to configure the frontends to simulate one or more targets in the field of view 17. For example, each target to be simulated can be individually configured in terms of distance, RCS and/or velocity, e.g. versus time. Two or more targets to be simulated can thereby be linked together.

The frontends 11, 11-1, 11-2, e.g. their type and/or location, can be defined upfront. For instance, this information can be provided via the first interface 13.

The computing device 12 can be configured to map defined targets to be simulated to specific frontends 11, 11-1, 11-2 of the system 10.

The computing device 12 can further be configured to control the frontends 11, 11-1, 11-2 to simulate a multi-target radar scenario. The multi-target radar scenario can comprise individual (or random) target behavior and/or defined scenarios across the field of view 17. The multi target radar simulation can be defined by and/or be based on information from the environmental simulation software module 22. The software modules 21 and/or 22 can be configured to automatically calculate the azimuth and elevation angle (e.g., max field of view, field of view of individual radar stimulators).

Once the multi-target scenario is configured, the computing device 12, in particular the module 21, can run the simulation. The simulation can comprise individual or random target behavior and/or a predefined scenario over time and across the field of view 17.

The system 10 as shown in any one of FIGS. 1-3 can be an over-the-air (OTA) radar simulation system. Preferably, the system 10 allows to simulate dependent as well as independent radar objects simultaneously in azimuth and elevation and across the complete FOV 17 of the radar device 20. Further, location gateway unit (LGU) tests can be performed by the system 10 with more than 200, in particular up to 1,000, simulated independent radar objects.

A typical use case in this regard, would be to simulate a urban street or intersection scenario in, e.g., in a metropolitan city like Seoul (OEM example) with six lanes in each direction where the sensor LGU of the radar device 20 needs to handle several hundred backscatter from moving and static objects.

Thereby, the system 10 can offer the advantage that the simulation can be done OTA with the complete sensor, and that no information about the modulation of the radar device 20 sensor is required. Further, the system 10 offers maximum flexibility in terms of configuration and is utmost scalable in terms for simulated objects and number and arrangement of frontends 11, 11-1, 11-2. In addition, each frontend 11, 11-1, 11-2 can work independently and self-sufficiently due to a built-in analog stepped delay line (ASDL) and Doppler module. Thus, no additional backend (BE) is required as each EM frontend 11 can work independently and self-sufficiently.

Figure 4:
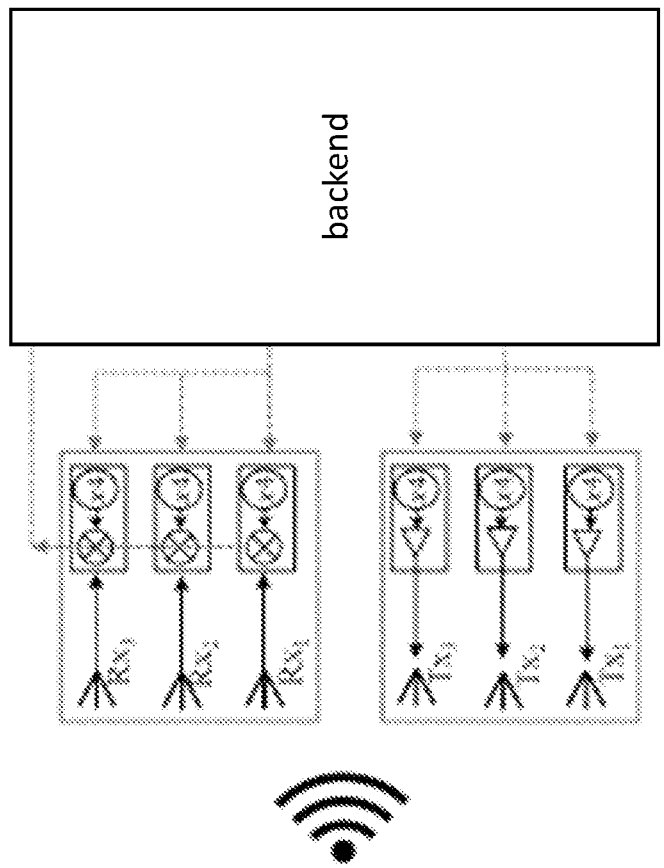
FIG. 4 shows a schematic diagram of an EM frontend according to an embodiment.

FIG. 4 shows a schematic diagram of an EM frontend according to an embodiment. For example, the frontends 11-1 in the system 10 shown in FIGS. 2 and 3 can be frontends as shown in FIG. 4.

The frontend in FIG. 4 comprises three RX/TX antenna pairs Rx1-Rx3, Tx1-Tx3 and is connected to a backend. The backend can comprise a signal conditioning part and/or a control interface.

The frontend in FIG. 4 can be configured to act as an electronically controllable corner reflector (ECCR) and can comprise, e.g. in its backend, an internal asymmetric digital subscriber line (ASDL) addressing radar distance up to 5 m with a step size of 5 cm as well as a standard interface to connect fiber delay lines to realize distances beyond the internal ASDL. This frontend can substitute mechanical corner reflectors used in large production chambers and allows for a reduced system size.

The frontend can further comprise an IF interface to connect, for instance, a digital target simulator and can be used together with an optional Doppler module.

Figure 5:
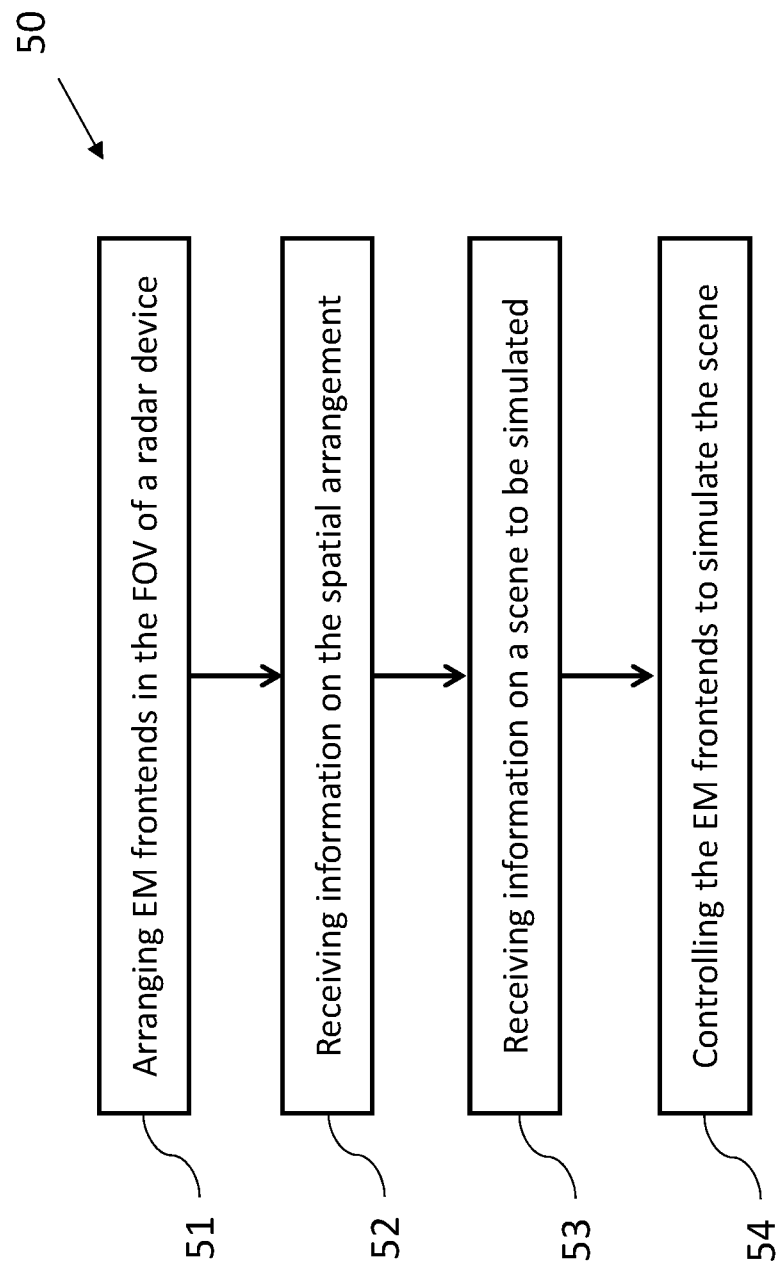
FIG. 5 shows a flow diagram of a method of testing a radar device according to an embodiment.

FIG. 5 shows a flow diagram of a method 50 of testing the radar device 20 according to an embodiment.

The method 50 comprises the steps of: arranging 51 the plurality of EM frontends 11, 11-1, 11-2 in a field of view 17 of the radar device 20, wherein the EM frontends 11, 11-1, 11-2 are configured to emit EM radiation towards the radar device 20; receiving 52 information on the spatial arrangement of the plurality of EM frontends 11, 11-1, 11-2; receiving 53 information on a scene to be simulated; and individually controlling 54 the EM frontends 11, 11-1, 11-2 based on their respective location such that the plurality of EM frontends 11, 11-1, 11-2 emit the EM radiation in the emission pattern that corresponds to the scene to be simulated.

For example, the method 50 can be carried out by the system 10 as shown in any one of FIGS. 1-3.

All features described above or features shown in the figures can be combined with each other in any advantageous manner within the scope of the disclosure.

The invention claimed is:

1. A system for testing a radar device under test, the system comprising:
    a plurality of frontend devices which are arranged in a field of view of the radar device under test and which are configured to emit electromagnetic (EM) radiation towards the radar device under test; and
    a computing device which is configured to control an EM emission behavior of the frontend devices;
    wherein the computing device comprises:
        a first interface configured to receive information on a spatial arrangement of the plurality of frontend devices and on a type of each of the frontend devices; and
        a second interface configured to receive information on a scene to be simulated;
    wherein the computing device is configured to individually control the frontend devices based on their respective location and their type such that the plurality of frontend devices emit the EM radiation in an emission pattern that corresponds to the scene to be simulated.

2. The system of claim 1,
    wherein the plurality of frontend devices comprises at least two frontend devices of a different type.

3. The system of claim 1,
    wherein at least one of the plurality of frontend devices comprises an antenna array.

4. The system of claim 1,
    wherein at least one of the plurality of frontend devices comprises a mixer;
    wherein the mixer is configured to convert an EM signal generated by the frontend device to a different frequency and/or to add a Doppler shift to an EM signal generated by the frontend device.

5. The system of claim 1,
    wherein the computing device is configured to output information on an optimized spatial arrangement and/or a minimal number N of the frontend devices to simulate the scene.

6. The system of claim 1,
wherein the computing device is configured to issue a warning if the scene or a portion of the scene cannot be simulated with a current arrangement of the frontend devices and/or with a current number N of the frontend devices.

7. The system of claim 1,
wherein the first interface comprises a user interface which is configured to receive the information on the spatial arrangement of the plurality of frontend devices from a user.

8. The system of claim 7,
wherein the user interface is a graphical user interface which is configured to display graphical representations of the frontend devices and their spatial arrangement.

9. The system of claim 1,
wherein the computing device comprises a further graphical user interface which is configured to receive a user input to manipulate the scene.

10. The system of claim 9,
wherein the further graphical user interface is configured to display a three-dimensional representation of the scene; and
wherein the further graphical user interface is configured to receive the user input on the displayed three-dimensional representation of the scene.

11. The system of claim 9,
wherein, in response to the user input, the computing device is configured to output information on an optimized spatial arrangement of the frontend devices to simulate the manipulated scene.

12. The system of claim 1,
wherein the computing device is configured to control the frontend devices to simulate the EM behavior of complex objects by coordinating the EM emission behavior of multiple frontend devices.

13. The system of claim 12, wherein the complex objects are scattering centers.

14. The system of claim 1,
wherein the computing device is configured to control the frontend devices to simulate random or quasi-random target behavior.

15. The system of claim 14, wherein the random or quasi-random target behavior is EM noise or false targets.

16. The system of claim 1,
wherein the computing device is connected to the individual frontend devices via a communication network.

17. The system of claim 10, wherein the user input on the displayed three-dimensional representation of the scene is in the form of a drag and drop gesture.

18. A method of testing a radar device under test, the method comprising the steps of:
arranging a plurality of frontend devices in a field of view of the radar device under test, wherein the frontend devices are configured to emit electromagnetic (EM) radiation towards the radar device under test;
receiving information on a spatial arrangement of the plurality of frontend devices and on a type of each of the frontend devices;
receiving information on a scene to be simulated; and
emitting EM radiation with the frontend devices in an emission pattern that corresponds to the scene to be simulated by individually controlling the frontend devices based on their respective location and their type.

* * * * *